United States Patent
Chesla et al.

(10) Patent No.: US 10,355,949 B2
(45) Date of Patent: Jul. 16, 2019

(54) BEHAVIORAL NETWORK INTELLIGENCE SYSTEM AND METHOD THEREOF

(71) Applicant: RADWARE, LTD., Tel Aviv (IL)

(72) Inventors: Avi Chesla, Tel-Aviv (IL); David Aviv, Tel-Aviv (IL); Lev Medvedovsky, Netanya (IL)

(73) Assignee: RADWARE, LTD., Tel Aviv (IL)

(*) Notice: Subject to any disclaimer, the term of this patent is extended or adjusted under 35 U.S.C. 154(b) by 170 days.

(21) Appl. No.: 14/560,381

(22) Filed: Dec. 4, 2014

(65) Prior Publication Data
US 2015/0156086 A1 Jun. 4, 2015

Related U.S. Application Data

(60) Provisional application No. 61/911,813, filed on Dec. 4, 2013.

(51) Int. Cl.
*H04L 12/26* (2006.01)
*H04L 12/24* (2006.01)

(52) U.S. Cl.
CPC .............. *H04L 43/08* (2013.01); *H04L 41/16* (2013.01); *H04L 43/04* (2013.01); *H04L 43/0894* (2013.01)

(58) Field of Classification Search
CPC ................................ H04L 43/04; H04L 43/08
See application file for complete search history.

(56) References Cited

U.S. PATENT DOCUMENTS

| | | | |
|---|---|---|---|
| 9,038,151 B1* | 5/2015 | Chua | H04L 45/02 709/223 |
| 9,083,740 B1* | 7/2015 | Ma | H04L 63/145 |
| 2004/0205772 A1* | 10/2004 | Uszok | H04L 29/06 719/317 |
| 2012/0079101 A1* | 3/2012 | Muppala | H04L 47/2441 709/224 |
| 2014/0003422 A1 | 1/2014 | Mogul et al. | |
| 2014/0043993 A1* | 2/2014 | Sirotkin | H04B 7/0632 370/252 |
| 2014/0098673 A1* | 4/2014 | Lee | H04L 45/64 370/238 |
| 2014/0123211 A1 | 5/2014 | Wanser et al. | |
| 2014/0123212 A1 | 5/2014 | Wanser et al. | |

(Continued)

OTHER PUBLICATIONS

Foster, et al., "Languages for Software-Defined Networks", IEEE Communications Magazine 51.2 (2013): pp. 128-134.

*Primary Examiner* — Tonia L Dollinger
*Assistant Examiner* — Steven C Nguyen
(74) *Attorney, Agent, or Firm* — M&B IP Analysts, LLC

(57) ABSTRACT

A method and system for determining the behavioral impact of applications and their respective users on a network carrier are provided. The method includes receiving data collected by at least one deep packet inspection (DPI) engine; classifying the received data at least per an application path respective of each of the applications; generating an application path profile data structure using the collected data; and generating, responsive to at least one behavioral rule, at least one degree of fulfillment (DoF) for the application path based on contents of the application path profile data structure, wherein the at least DoF defines an association of the application path with at least one behavior group, wherein the behavior group determines the behavioral impact of an application represented by the application path.

31 Claims, 8 Drawing Sheets

(56) References Cited

U.S. PATENT DOCUMENTS

| | | |
|---|---|---|
| 2014/0237456 A1 | 8/2014 | Monclus et al. |
| 2014/0241346 A1 | 8/2014 | Cohn et al. |
| 2014/0241347 A1 | 8/2014 | Yadav et al. |
| 2014/0245443 A1 | 8/2014 | Chakraborty |
| 2014/0280488 A1 | 9/2014 | Voit et al. |
| 2014/0280835 A1 | 9/2014 | Pruss et al. |
| 2014/0280893 A1 | 9/2014 | Pfeifer et al. |
| 2014/0282628 A1 | 9/2014 | Pruss et al. |
| 2014/0307556 A1 | 10/2014 | Zhang |
| 2014/0325038 A1 | 10/2014 | Kis |
| 2014/0359697 A1 | 12/2014 | Ji |
| 2015/0052243 A1* | 2/2015 | Lumezanu .............. H04L 43/04 709/224 |

* cited by examiner

| "Application path" 410 | | | | Parameters 420 | | | | | |
|---|---|---|---|---|---|---|---|---|---|
| | | | | PPS | CUC | Bytes | Symmetry | CPS | # Users ... |
| Dest L4 Port | | | | 2000 | 20K | 1M | In 100% | 2K | |
| | Application A | | | 2000 | | | | | |
| | | Browser type A | | 1010 | | | | | |
| | | | OS1 | 1000 | | | | | |
| | | | OS2 | 10 | | | | | |
| | | Browser type B | | | | | | | |
| | Application B | | | | | | | | |

BEHAVIORAL NETWORK INTELLIGENCE SYSTEM AND METHOD THEREOF

CROSS REFERENCE TO RELATED APPLICATIONS

This application claims the benefit of U.S. provisional application No. 61/911,813 filed on Dec. 4, 2013, the contents of which are herein incorporated by reference.

TECHNICAL FIELD

This disclosure generally relates to techniques for monitoring traffic in software defined networks, and particularly for techniques for determining the behavior of applications and users, in such networks.

BACKGROUND

A software defined networking (SDN) is a relatively new type of networking architecture that provides centralized management of network elements rather than a distributed architecture utilized by conventional networks. In a distributed architecture, each network element makes routing, switching, and similar decisions based on the results of traffic processing and a distributed control mechanism. In contrast, in a SDN, a network element follows routing, or switching, decisions received from a central controller.

The operation of a network element can be logically divided into a "control path" and a "data path". In the control path, control protocols, e.g., for building in routing protocols, a spanning tree, and so on, are operable. In the data path, packets-processing operations are performed on a per-packet basis. Such operations include examining each incoming packet and making decisions based on the examination as to how to handle the input packet (e.g., packet forwarding, packet switching, bridging, load balancing, and so on). Furthermore, in a conventional network, network elements typically include both the control and data planes, whereas in a native SDN, the network elements include the data path, and the central controller implements the control path.

The SDN can be implemented in wide area networks (WANs), local area networks (LANs), the Internet, metropolitan area networks (MANs), ISP backbones, datacenters, inter-datacenter networks, and the like. Each network element in the SDN may be a router, a switch, a bridge, a load balancer, and so on, as well as any virtual instantiations thereof.

In one configuration of a SDN, the central controller communicates with the network elements using an OpenFlow protocol. Specifically, the OpenFlow protocol allows addition of programmability to network elements for the purpose of packets-processing operations under the control of the central controller, thereby allowing the central controller to dynamically define the traffic handling decisions in the network element. To this end, traffic received by a network element that supports the OpenFlow protocol is processed and forwarded according to a set of rules defined by the central controller.

Traffic received by a network element that supports the OpenFlow protocol is processed and routed according to a set of rules defined by the central controller based on the characteristic of the required network operation. Such a network element routes traffic according to, for example, a flow table, and occasionally sends packets to the central controller. Each network element is programmed with a flow table and can be modified by the central controller as required. The operation of network elements and the definition of flow tables according to the OpenFlow protocol are further described in the OpenFlow Switch Specifications issued by the Open Networking Foundation.

Due to the programmability, scalability and other features of SDN architectures, network carriers have started to deploy and utilize SDNs as part of their infrastructures to efficiently handle the vast number of mobile devices accessing their respective networks. The use of such mobile devices (e.g., smart phones and tablet computers) has significantly increased and in many cases, such mobile devices have become a primary replacement for other computing devices.

Network carriers allow access to data by the mobile device through a variety of applications. The data bandwidth consumption (in both directions, i.e., upload and download of data) by applications installed in mobile devices through, for example, cellular networks, tends to congest or overload the network's resources. This is due to, for example, the way applications are programmed, the asynchronous demand for data bandwidth by applications, and the way users interact with applications. For example, an application can be programmed with an embedded security breach that causes unauthorized data transmission over the network to external users. As another example, an application can be poorly programmed to continuously synchronize with application servers, thereby causing misuse of computing and/or network resources. Such misuse of resources is typically not aligned with the carrier capacity planning.

Monitoring and detecting the behavioral impact of applications such as, for example, applications that congest or overload the network's resources, is not a straightforward task. This difficulty occurs due to the number of available applications, the different types of mobile devices, and the sporadic usage of applications. For example, an application can exhibit a security breach when running over an Android® operating system, but not when running on iOS®. In some cases, the same application can operate properly in conjunction with iOS® version 'x', but not in conjunction with iOS® version 'y'.

The complexity of a solution for detecting the behavioral impact of applications lies in the fact that applications are created and/or updated on a daily basis. In addition, the requirements of network carriers with respect to the resources that should be monitored can be different from one carrier to the other.

Existing solutions are limited to monitoring the network traffic to detect a set of predefined network events, such as high packet rates over a particular channel, a high latency between two hops in the network, and an ideal network resource. The existing traffic monitoring solutions are not adapted to detect the root cause of such network events, and specifically the behavioral impact of applications installed on mobile devices. Furthermore, existing traffic monitoring solutions cannot be rapidly modified and/or scaled to monitor different applications, resources and/or events.

Therefore, it would be advantageous to provide a solution that overcomes at least the deficiencies noted above.

SUMMARY

A summary of several example aspects of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all aspects nor delineate the scope of any or all aspects. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

Certain embodiments disclosed herein include a method for determining the behavioral impact of applications on a network comprising receiving data collected in real-time by at least one deep packet inspection (DPI) engine, wherein the collected data includes a set of behavioral parameters; classifying the received data at least per an application path respective of each of the applications; dynamically updating, using the classified data, an application path profile data structure of the application path; and generating using at least one behavioral rule and the updated application path profile data structure, at least one degree of fulfillment (DoF) for the application path, wherein the at least DoF defines an association of the application path with at least one behavior group, wherein the behavior group determines the behavioral impact of an application represented by the application path.

Certain embodiments disclosed herein further include a system for determining the behavioral impact of applications and their respective users on a network, comprising a processor; a network-interface module connected to a software defined network (SDN) and configured to communicate with a plurality of network elements of the SDN; a memory connected to the processor and configured to contain a plurality of instructions that when executed by the processor configure the system to: receive data collected in real-time by at least one deep packet inspection (DPI) engine, wherein the collected data includes a set of behavioral parameters; classify the received data at least per an application path respective of each of the applications; dynamically update, using the classified data, an application path profile data structure of the application path; and generate, using at least one behavioral rule and the updated application path profile data structure, at least one degree of fulfillment (DoF) for the application path, wherein the at least DoF defines an association of the application path with at least one behavior group, wherein the behavior group determines the behavioral impact of an application represented by the application path.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
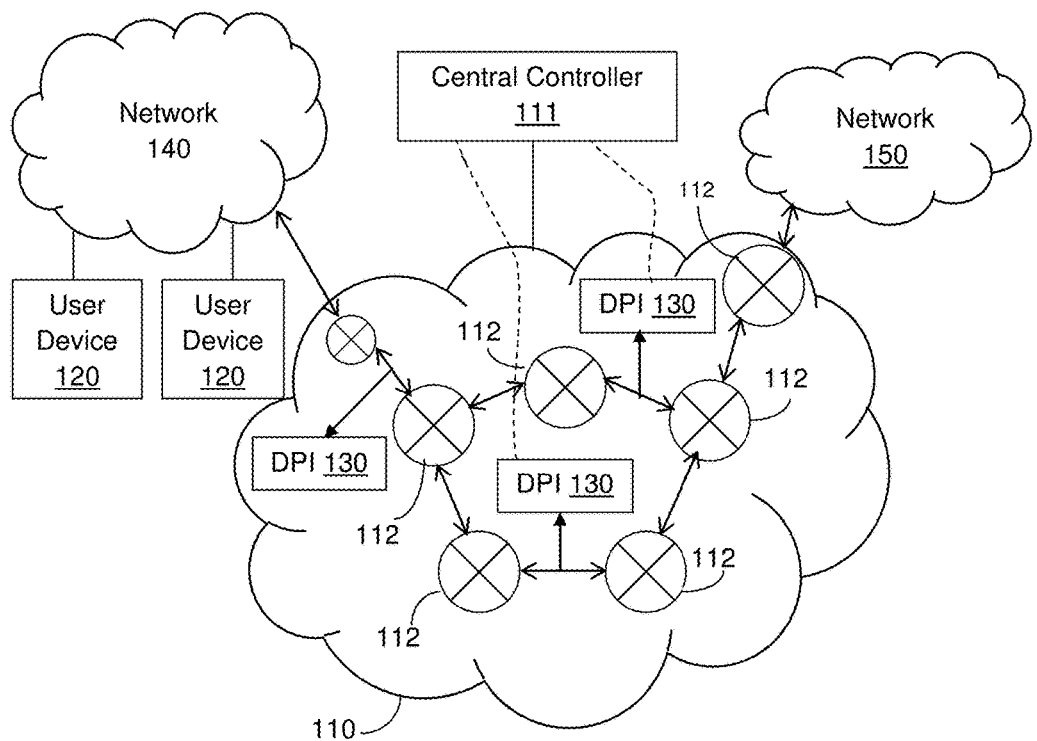
FIG. 1 is a schematic diagram of a network system utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for advanced application and user behavioral monitoring. The monitoring is distributed between a deep packet inspection (DPI) fabric and a central controller of a software defined network (SDN) configured to monitor, detect, and determine the behavioral impact of applications (e.g., mobile applications "apps") utilizing resources of a network carrier.

FIG. 1 is an exemplary and non-limiting diagram of a system 100 utilized to describe the various disclosed embodiments. The system 100 includes a software defined network (SDN) 110 containing a central controller 111 and a plurality of network elements 112. The network elements 112 communicate with the central controller 111 using, for example, an OpenFlow protocol. As noted above, in a SDN the central controller 111 can configure the network elements 112 to perform certain data path operations.

A plurality of deep-packet inspection (DPI) engines 130 are also connected in the SDN 110 to the network elements 112 or to a link between two elements 112. Each DPI engine 130 may be a physical machine and/or a virtual machine. In an embodiment, a DPI engine 130 is deployed as part of the data-plane in a tap mode and configured to monitor the traffic and to classify the traffic per flow. Each DPI engine 130 is further configured to provide advanced application behavioral analytics with respect to the processed flows. The data collected and analyzed by the DPI engines 130 is sent to the central controller 111 through a protocol utilized by the SDN 110 (e.g., an OpenFlow protocol), or any other type of reporting protocol can be utilized for this purpose. In an embodiment, the DPI engines 130 collect and analyze data in real-time.

The DPI engines 130 are part of an elastic DPI fabric in which engines can be dynamically added or removed based on a traffic distribution function controlled by the central controller 111. This function allows an elastic scale of traffic flows inspection through the SDN 110. The traffic distribution function is based on a set of traffic parameters and the utilization of the available DPI engines.

The networks 140 and 150 are typically external to the SDN 110 and each may be, for example, a WAN, the Internet, an Internet service provider (ISP) backbone, and the like. The SDN 110 can be implemented as wide area networks (WANs), local area networks (LANs), service provider backbones, datacenters, inter-datacenter networks, a private cloud, a public cloud, a hybrid cloud, and the like.

In an exemplary deployment, the network 140 is an access network while the network 150 is the Internet. A plurality of user devices (collectively referred to as user devices 120, merely for simplicity purposes) is connected to the network 140. A user device 120 may be, for example, a smart phone, a tablet computer, a personal computer, a laptop computer, a notebook computer, a wearable computing device, or any device that can communicate with the network 140. Each of the user devices 120 is installed with an operating system (OS) and can execute one or more applications (apps). Applications can access servers or storage systems (not shown) residing in the network 150 for the purpose operating the applications. For example, a YouTube® application installed on a user device 120 streams video clips from servers located in the network 150. An application executed or accessed through a user device 120 may be, but is not limited to, a mobile application, a virtual application, a web application, a native application, and the like. It should be noted that all traffic between the networks 140 and 150 pass through the SDN 110.

According to various embodiments disclosed herein, the central controller 111 is configured to perform a behavioral network intelligence process to determine at least the behavioral impact of applications installed in the user devices 120. To this end, the central controller 111 is configured to aggregate data collected by DPI engines 130, analyze the aggregated data, and generate reports about usage and behavioral impact of applications. The analysis, performed by the central controller 111, includes in part behavioral and security analyses as described in more detail below.

As noted above, the network intelligence behavioral process provides the operator of the SDN 110 with visibility of the behavioral impact of existing mobile applications and users of such applications. In an embodiment, the behavioral impact is an association of an application path and users with at least one predefined behavior group. A behavior group includes at least a group of application paths operated by users detected to perform activity related to one or more of: network scanning activity, generic bot activity, chatty activity, and the like.

An application path is defined as a set of one or more attributes related to the application and to usage of the application. Examples for such attributes include an application name and version, a device type (e.g., iPhone, Nokia), an operating system (OS) type and version, a browser type, a layer-4 (transport) protocol utilized by the application (e.g., UDP), a layer-7 (application) protocol utilized by the application (e.g., HTTP), geographical location of the users accessing the application (sources), and any metadata (e.g., video codec, user ID, etc.) associated with the application. In certain embodiments, an administrator of the network can configure which applications, attributes of the application path, and network resources are to be monitored.

Figure 2:
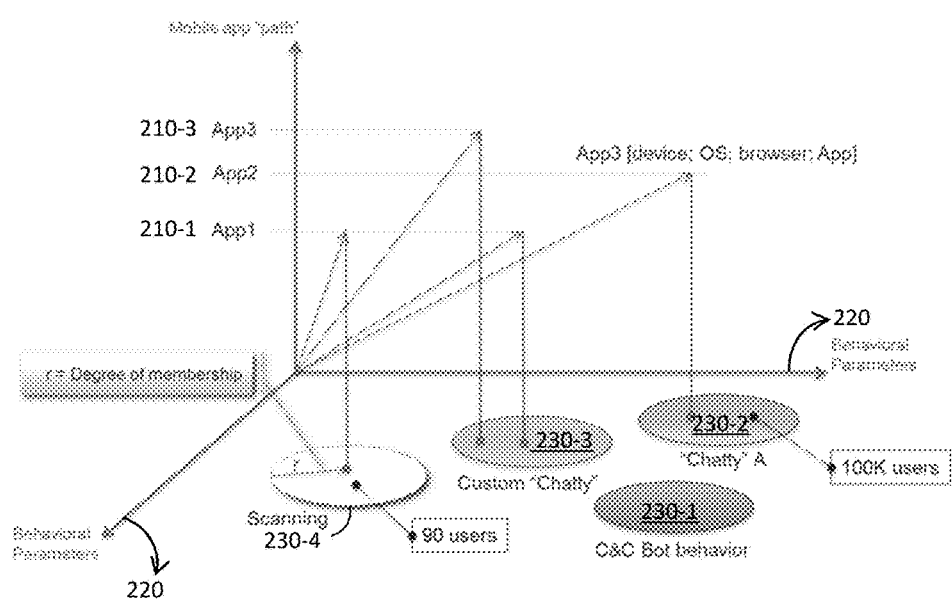
FIG. 2 illustrates a projection of behavioral impact of an application based on extracted traffic characteristic information.

FIG. 2 shows an exemplary graph 200 illustrating the behavioral impact of applications defined through application paths 210-1 (App-1), 210-2 (App-2) and 210-3 (App-3) mapped to a set of behavioral parameters 220. An application path may include the attributes of device type, OS, browser, and application names.

The behavioral impact of users of applications defined through application paths 210-1, 210-2, and 210-3 include the behavior groups Bot (or malware) activity 230-1, "chatty" activity 230-2, and custom "chatty" 230-3, and scanning activity 230-4. The different between the behavior groups 230-2 and 230-3 is the level of activity. In an embodiment, each behavior group includes the number of users associated with this group. Examples for behavioral parameters 220 are provided below.

As an example, a mapping between "App-2" 210-2 to group 230-2 indicates that there are 100,000 (100K) users of an application path "App-1" 210-1 having a Nokia device installed with an outdated OS version. As a result, these devices are infected with spyware that generates a large amount of bandwidth. As another example, there are 90 users of "App-1" 210-1 through a scan of the network at very high rate.

The number of users associated with each behavior group provides a good indication of the impact of an application or an application path on the network. This indication enables network operators/carriers to make educated decisions with respect to their infrastructure and/or services.

In an embodiment, a user of an application path is associated with a behavior group based on at least one configurable behavioral rule. In an exemplary implementation, a behavioral rule is defined respective of a multivariate set of behavioral parameters to determine a deterministic score, which is a degree of fulfilment (DoF). The DoF is compared to a certain threshold level. That is, the DoF defines the behavior group with respect to an application profile that a set of observed behavioral parameters belong to. As an example, if a connection rate per source is above a certain learned or predefined threshold level, then the application path is chatty. The rules can be defined through a human linguistics interface allowing novice users (e.g., administrators) to easily define or modify behavior groups.

The thresholds that are part of the behavioral rules are pre-configured and can be dynamically and adaptively modified by the controller 111. A threshold may be realized in any form of expression. In an embodiment, such threshold is defined a degree of fulfilment (DoF). The central controller 111 generates a set of DoFs in time intervals utilized to correlate the various monitored parameters. Examples for determination of DoFs are provided below. The rules are mapped to multivariate set of several temporary parameters.

Referring back to FIG. 1, in an embodiment, the central controller 111 is configured to program the network elements 112 to distribute copies of traffic through one or more DPI engines 130 connected thereto. Each DPI engine 130 is configured to classify each incoming flow and to assign application path attributes to the flow. Each DPI engine 130 is further configured to gather and add information values of behavioral parameters related to the flow to the application path, such as, but not limited to, a packet rate, byte rate, TCP state errors, flow symmetry attributes, a data direction (inbound or outbound), a number of new connections per second and per application (CPS), a concurrent number of connections per application (CUC), an average application flow duration or length (in bytes), a transport protocol (UDP or TCP) state, and so on. In an embodiment, the behavioral parameters are arranged in the DPI engine 130 in a data structure being sent to the central controller 111 at predefined time intervals.

For the purpose of performing the behavioral network intelligence process, the central controller 111 is configured to collect the flow information (e.g., application path and behavioral parameters) from all DPI engines 130 and to aggregate the received information per application and per user. The agreed information is analyzed to determine at least the behavioral impact of applications and users on the network.

Figure 3:
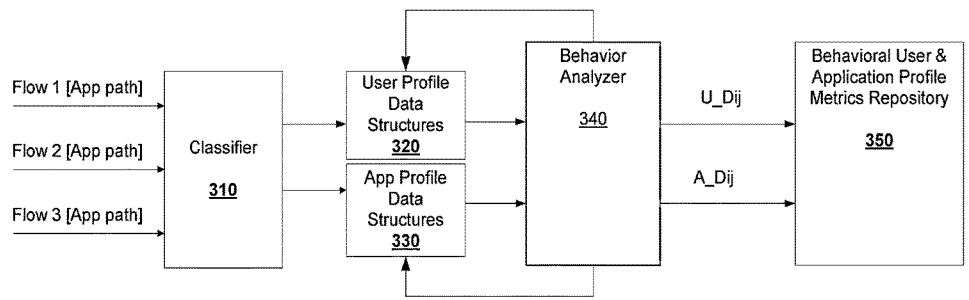
FIG. 3 is a diagram of a central controller illustrating the operation of the behavioral network intelligence process according to an embodiment.

FIG. 3 shows an exemplary and non-limiting diagram of the central controller 111 illustrating the operation of the behavioral network intelligence process according to one embodiment.

The central controller 111 includes a classifier 310 configured to receive data from the DPI engines 130 and to create or otherwise update user profile data structure 320 and application profile data structure 330. An application profile data structure 330 is created and updated per application type defined by one or more of the application path attributes mentioned above. A user profile data structure 320 is created and updated per user identified by a user ID. A user ID may be, for example, a source IP address of the user device (e.g., a device 120), a subscription identifier (e.g., MSISDN), a user name, or any other identifier, and so on, or any combination thereof.

Each of the user profile data structures 320 and application profile data structures 330 include a set of behavioral parameters. Such parameters include, but are not limited to, a number of transmitted packets or bytes, a transmission rate of packets and bytes, a data direction (inbound or outbound), a number of new connections per second and per application (CPS), a concurrent number of connections per application (CUC), an average connection duration or size (in bytes), a transport protocol (UDP or TCP) state, and so on. It should be noted that the same set of parameters may be included in a user and application profile, but the aggregation of such parameters may be different.

Figures 4, 5:
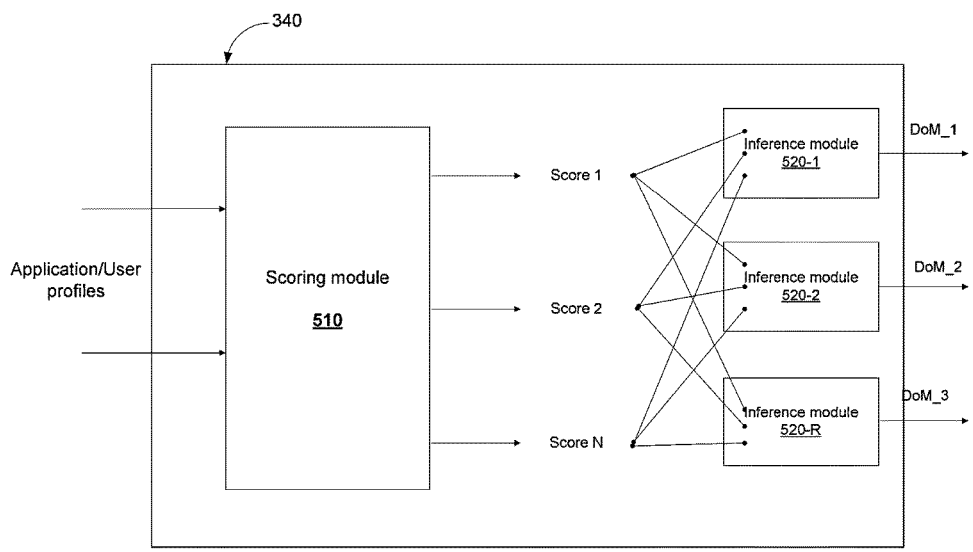
FIG. 4 is a diagram of an application path profile data structure.
FIG. 5 is a schematic block diagram of a behavior analyzer according to one embodiment.

An exemplary diagram of an application profile data structure 330 is illustrated in FIG. 4. In this example, the highest hierarchy is the destination L4 port which comprises more granular application identity attributes (410) in the application path and the respective profile parameters (420).

Referring back to FIG. 3, the user and application profile data structures 320 and 330 are fed to the behavior analyzer 340 at predefined time intervals or upon occurrence of predefined events. The behavior analyzer 340 is configured to characterize or determine the behavior groups of an application path for the users. To this end, the behavior analyzer 340 is configured to generate DoFs according to a set of behavioral rules and the parameters' values in the user and application profiles. The DoFs are generated per user (identified by a user ID) and per an application path and are saved in a repository 350 for future analysis.

As noted above, the different behavioral rules apply the different DoFs to characterize the application paths and users to different types of behavior groups. These groups include, for example, a degree of a "chatty" user, a degree of network scanning user activity, a degree of application scanning user activity, a degree of custom behavior user activity, a degree of "chatty" application, and so on.

FIG. 5 is an exemplary diagram illustrating the operation of the behavior analyzer 340 according to one embodiment, the behavior analyzer 340 includes a scoring module 510 and a plurality of inference modules 520-1 thorough 520-R (collectively referred to as inference modules 520). The scoring module 510 is configured to compute a plurality of behavioral scores (or degree of fulfilment (DoFs) based on the parameters saved in the user and/or application profile data structures 320 or 330. Specifically, a behavioral score is computed for each parameter or a set of parameters in a profile data structure 320 or 330. The behavioral score (DoF) can be estimated respective of the parameters' values, for example, an average connection rate per user or source. As another example, the behavioral score can be estimated respective of a maximum total number of sources per application. Other examples for such scores include, but are not limited to, an error states TCP score, an error state UDP, an application TCP score, an application UDP score, and so on.

The computed scores are fed to the inference modules 520. As illustrated in FIG. 5, a score can be fed to one, some, or all of the inference modules 520. Each of the inference modules 520 is a programmable module configured to generate the DoF to at least one behavior group. To this end, each inference module 520 is configured to correlate its input scores based on predefined and customized behavioral rules. In an embodiment, the behavioral rules are human linguistics rules that are implicitly translated into computational functions by each inference module 520. The behavioral rules can be customized to discover new behaviors or new behavior sensitivities in the network.

In an embodiment, each inference module 520 outputs the generated DoF and the respective behavior group type that the DoF is applied to. For example, the DoF may be an integer number from 1 to 10; an output of a DoF=8 and scanning indicates that the application path can be associated with "scanning behavior group." Collectively or alternatively, each inference module 520 can output a vector including the generated DoF and all parameters that are associated with the application path.

According to various disclosed embodiments, the scoring and inference modules 510 and 520 can operate in both adaptive and deterministic modes. As such, the operation of modules 510 and 520 can be modified based on an adaptive mechanism (not shown). Specifically, the adaptive mechanism can tune the scoring functions (computed by the module 510) and the behavioral rules, thereby allowing the network to inject a real "environmental" context to the rules to gain real and accurate behavior impact monitoring.

The adaptive mechanism is based on an adaptive parameter and a sensitivity input. The adaptive parameter can be set according to normal learned values that are stored as part of the profile data structures 320 and 330. The sensitivity input allows a user (e.g., a network administrator) to define different sensitivity levels (e.g., high, medium, low) when computing the DoF. For example, the sensitivity level may adjust the weights assigned to different scores.

In an embodiment, the determined DoF and their respective behavior groups are displayed in a graphical representation allowing easy detecting and monitoring of behavioral impact and trends in the network. Exemplary and non-liming graphical representations generated according to the disclosed embodiments are shown in FIGS. 6, 7, and 8.

Figure 6:
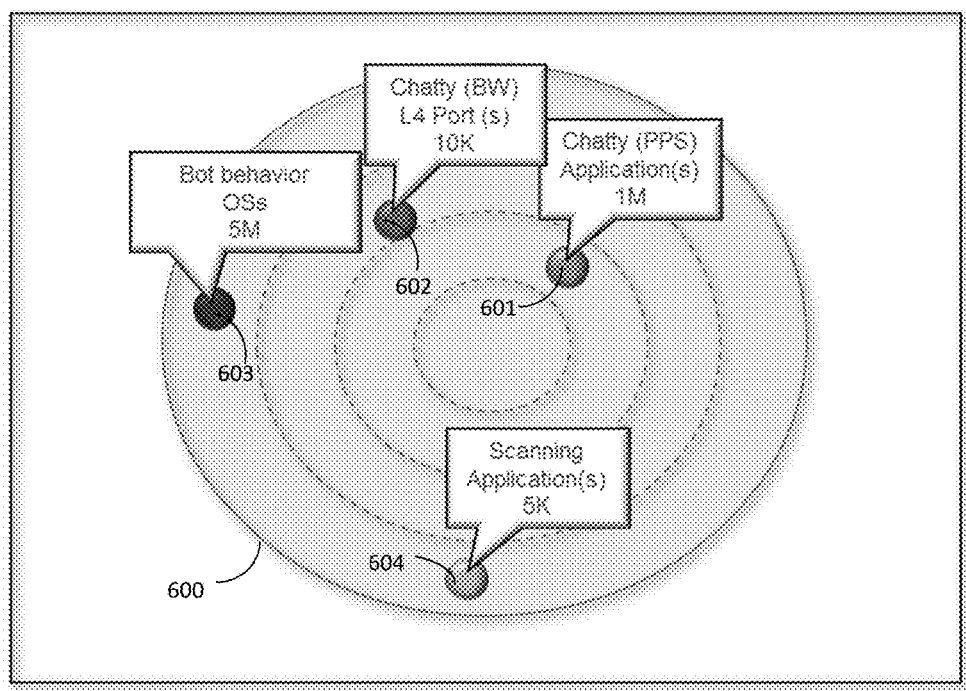
FIG. 6 illustrates a dashboard with the input parameters degree of membership scope and sources according to an embodiment.

FIG. 6 is a graph illustrating DoFs 601, 602, 603, and 604 generated for behavior groups chatty (defined by PPS), chatty (defined by bandwidth), Bot behavior, and scanning respectively. In addition, the number of users in each group is also displayed. DoFs that are closer to the center of the radar 600 represent strong membership to the group.

Figure 7:
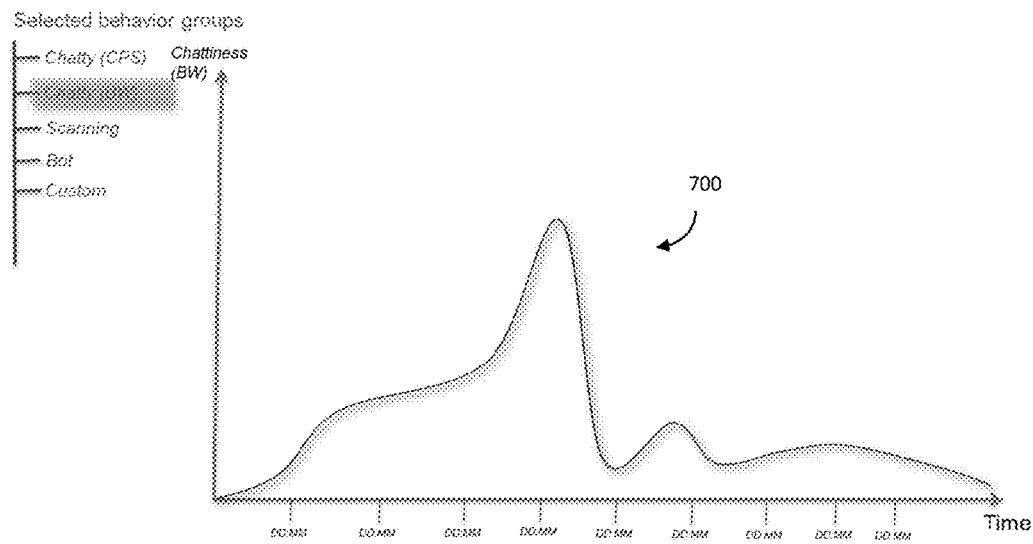
FIG. 7 illustrates a date/time historical graph per behavioral group selection according to an embodiment.
Figure 8:
FIG. 8 illustrates a date/time bar graph per application date and time according to an embodiment.

FIG. 7 illustrates a date/time historical graph 700 per behavioral group selection. The graph 700 shows the value DoF at each point in time in the past. FIG. 8 shows a date/time bar graph 800 per application date and time. The number of applications, time windows, and/or behavior groups that can be displayed in each graph is configurable.

In one embodiment, the central controller 111 is also configured to extract user or source information from the monitored application paths. This allows applying certain functions to a user and/or source, for example, blocking a source or user that generates Bot activity. This further allows performing a reputation analysis, for example, by correlating a specific source/use that been identified across different behavior groups for the same application paths or on different paths.

In a non-limiting embodiment, the extraction of source/user information can be performed based on match criteria in an inspected packet, for example, a signature match on a URL. This information can be extracted by a DPI engine 130 and communicated directly to the central controller 111.

Alternatively or collectively, when a predefined DoF exceeds a certain threshold, the central controller 111 instructs the DPI engines 130 to extract information from a source associated with the DoF's behavior group for a configurable duration of time. The extracted information can be saved in a source table being populated with user IDs and/or source IP addresses and the extracted information. The data extraction table population in this embodiment can be performed in the background.

Figure 9:
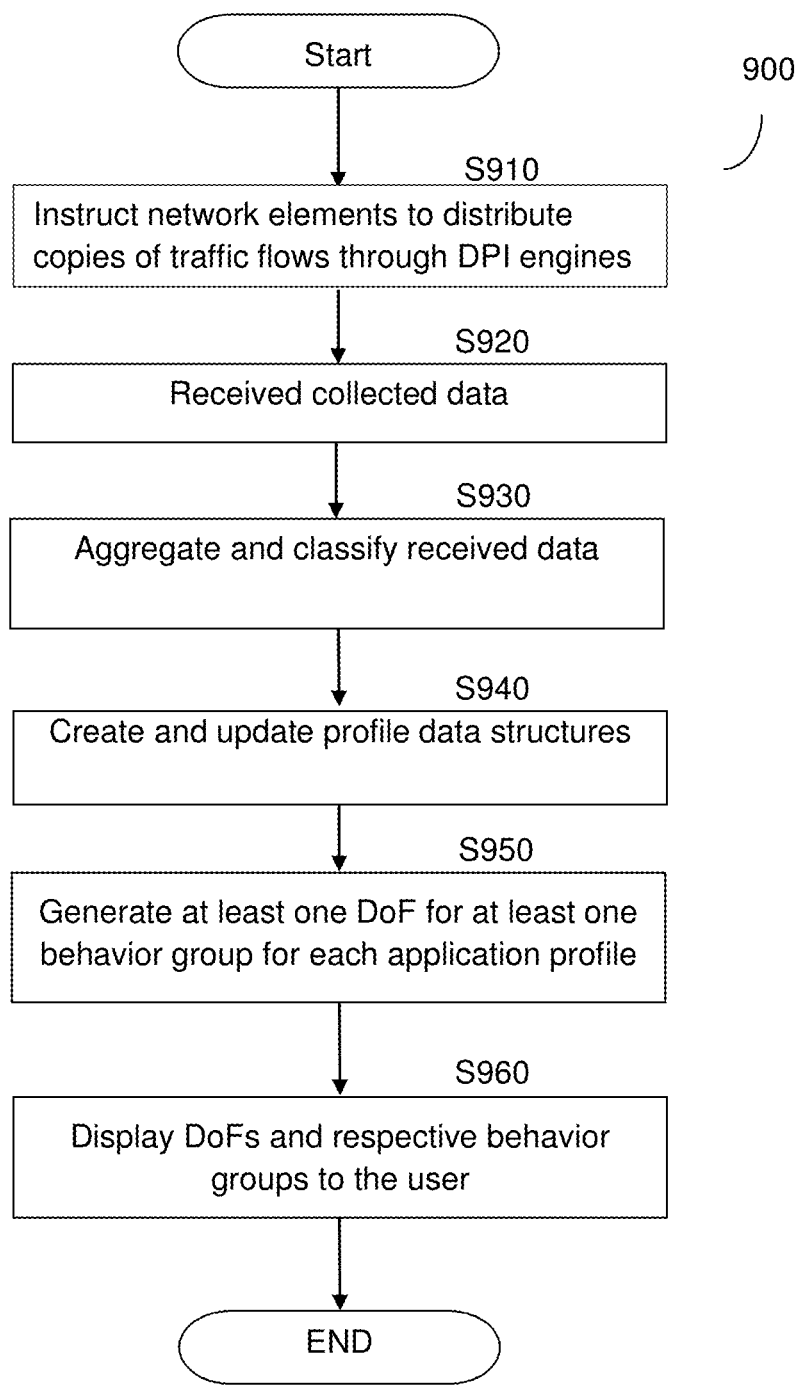
FIG. 9 is flowchart illustrating the operation of a behavioral network intelligence process according to one embodiment.

FIG. 9 shows an exemplary and non-limiting flowchart 900 illustrating the operation of a behavioral network intelligence process as performed by the central controller 111 according to one embodiment.

At S910, all network elements 112 are instructed to distribute copies of traffic flows through one or more DPI engines 130 connected thereto. At S920, data collected in real-time by the DPI engines 130 is received. The collected data includes, for example, behavioral parameters' related to the flow, application path attributes detected in a flow, or any information that DPI engines 130 are provisioned to collect. The behavioral parameters' include, for example, a number of packets in the flow, a number of bytes in the flow, TCP state errors, flow symmetry attributes, and so on.

At S930, the received data from the different DPI engines 130 is aggregated and classified per application path and user ID. At S940, user profile data structures 320 and application path profile data structures 330 are created or otherwise dynamically updated with the real-time collected data. The various embodiments to perform S940 are discussed above in greater detail with respect to FIGS. 3 and 4.

At S950, for each application path profile data structure 330, at least one DoF for at least one behavior group is generated. A behavior group may be defined based on a set of behavioral rules. Various examples for behavior groups are provided above. In an embodiment, a DoF is generated for each user using an application path to determine the number of users that belong to a certain behavior group.

As discussed in detail above with respect to FIG. 5, the determination of a DoF (performed at S950) includes at least computation of behavioral scores for the parameters included in the profile data structures 320 and 330 and correlating the computed scores based on predefined behavioral rules.

At S960, for each application path, the DoFs and their respective behavior groups are displayed to the user. In one embodiment, graphical representations of such information are generated and displayed. Non-limiting examples for graphical representations are provided in FIGS. 6-8. It should be noted that the generated profiles and their contents, DoFs, and computed behavioral scores can also be stored in a database (not shown) for future use.

Figure 10:
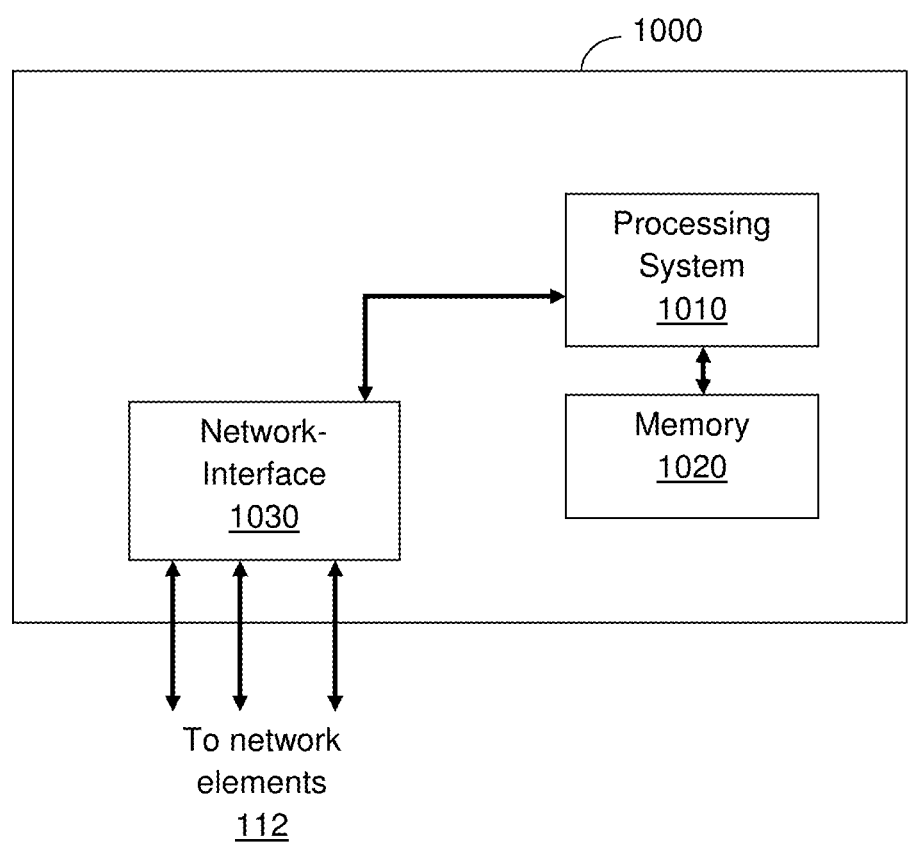
FIG. 10 is a block diagram of a central controller according to another embodiment.

FIG. 10 shows an exemplary and non-limiting block diagram of the central controller 1000 constructed according to one embodiment. The central controller 1000 is operable in a SDN, such as those defined above methods described in greater detail above. The central controller 1000 includes a processing system 1010 coupled to a memory 1020 and a network-interface module 1030.

The network-interface module 1030 allows the communication with the network elements 112 of the SDN. In one embodiment, such communication uses the OpenFlow protocol discussed above through a secure channel established with each network element 112. In another embodiment, the communication is achieved through another control channel.

The processing system 1010 uses instructions stored in the memory 1020 to execute tasks generally performed by the central controllers of SDN as well as to control and enable the operation of behavioral network intelligence processes disclosed herewith. In an embodiment, the processing system 1010 may include one or more processors. The one or more processors may be implemented with any combination of general-purpose microprocessors, multi-core processors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

It should be noted that the teachings disclosed herein are also applicable to hybrid networks in which a SDN is a sub-network of a conventional network in which its elements cannot be programmed by a central controller. To allow the proper operation of the methods disclosed above in the hybrid network, certain network elements in the diversion path should be adapted to allow programmability by the central controller adapted to operate in a SDN (e.g., central controller).

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for determining the behavioral impact of applications installed in user devices on a network, comprising:
receiving data collected in real-time by at least one deep packet inspection (DPI) engine, wherein the collected data includes a set of behavioral parameters;
classifying the received data at least per an application path for each of the applications, wherein each application path includes at least an identifier of its respective application;
dynamically updating, using the classified data, an application path profile data structure of the application path;
generating, using at least one behavioral rule and the updated application path profile data structure, at least one degree of fulfillment (DoF) for the application path, wherein the at least DoF defines an association of the application path with at least one behavior group, wherein the behavior group determines the behavioral impact on the network of an application represented by the application path;
identifying an origin, wherein the origin is at least one of user and source, by extracting origin information from the application path; and
blocking data from the identified origin when behavioral impact on the network of the application represented by the application path indicates Bot activity.

2. The method of claim 1, wherein the method is performed by a central controller of a software defined network (SDN), wherein the SDN further comprises a plurality of network elements, and wherein the SDN is part of an infrastructure of the network.

3. The method of claim 2, further comprising:
programming the plurality network elements to distribute copies of incoming traffic flows through the at least one DPI engine.

4. The method of claim 1, wherein the application path is defined as a set of attributes related to the application and usage of the application.

5. The method of claim 4, wherein the set of attributes of the application path include at least one of: an application name, an application version, a device type, an operating system type, an operating system version, a browser type, an application type, a transport protocol, an application protocol, application metadata, and a source location.

6. The method of claim 1, wherein classifying the received data per application path further comprising:
classifying the received data per a user identifier using the application associated with the application path, wherein the user is identified by a unique user identifier; and
for each classified user, generating a user profile data structure using the collected data.

7. The method of claim 6, wherein the received data includes at least a set of behavioral parameters collected with respect to the usage of the application associated with the application path.

8. The method of claim 7, wherein each of the user profile data structure and the application path profile data structure includes the set of collected behavioral parameters.

9. The method of claim 6, wherein each of behavioral parameters is any one of: a packet rate, a byte rate, a data direction, a new connections per second and per application (CPS), a concurrent number of connections per application (CUC), an average connection duration, an average connection size, and a transport protocol state.

10. The method of claim 6, further comprising:
determining a number of users of a respective application path that can be associated with the at least one behavior group.

11. The method of claim 1, wherein the at least one behavior group is defined by the at least one behavioral rule, wherein the at least one behavioral rule is dynamically changed.

12. The method of claim 11, wherein the at least one behavioral rule is a human linguistics rule being implicitly translated into one or more functions.

13. The method of claim 11, wherein generating the at least one DoF further comprising:
computing a behavioral score for each behavioral parameter included in a user profile data structure and an application path profile data structure; and
correlating the computed the behavioral scores using the at least one behavioral rule to generate the at least one DoF.

14. The method of claim 13, further comprising:
comparing the at least one DoF against a threshold to determine an association with the at least one behavior group, wherein the threshold is defined in the at least one behavioral rule.

15. The method of claim 1, wherein the at least one behavior group defines at least any one of: various variance of chatty activity, various variance of malware activity, and various variance of scanning activity.

16. A non-transitory computer readable medium having stored thereon instructions for causing one or more processing units to execute the computerized method according to claim 1.

17. A system for determining the behavioral impact of applications installed in user devices on a network, comprising:
a processor;
a network-interface, comprising logic, the network-interface being coupled to the processor and configured to communicate with a plurality of network elements of a software defined network (SDN);
a memory coupled to the processor and containing a plurality of instructions that when executed by the processor configure the system to:
receive data collected in real-time by at least one deep packet inspection (DPI) engine, wherein the collected data includes a set of behavioral parameters;
classify the received data at least per an application path for each of the applications, wherein each application path includes at least an identifier of its respective application;
dynamically update, using the classified data, an application path profile data structure of the application path;
generate, using at least one behavioral rule and the updated application path profile data structure, at least one degree of fulfillment (DoF) for the application path, wherein the at least DoF defines an association of the application path with at least one behavior group, wherein the behavior group determines the behavioral impact on the network of an application represented by the application path;
identify an origin, wherein the origin is at least one of user and source, by extracting origin information from the application path; and
block data from the identified origin when behavioral impact on the network of the application represented by the application path indicates Bot activity.

18. The system of claim 17, wherein the SDN is part of an infrastructure of the network.

19. The system of claim 18, wherein the system is further configured to:
program the plurality network elements to distribute copies of incoming traffic flows through the at least one DPI engine.

20. The system of claim 17, wherein the application path is defined as a set of attributes related to the application and usage of the application.

21. The system of claim 20, wherein the set of attributes of the application path include at least one of: an application name, an application version, a device type, an operating system type, an operating system version, a browser type, an application type, a transport protocol, an application protocol, application metadata, and a source location.

22. The system of claim 17, wherein the system is further configured to:
classify the received data per a user identifier using the application associated with the application path, wherein the user is identified by a unique user identifier; and
for each classified user, generate a user profile data structure using the collected data.

23. The system of claim 22, wherein the received data includes at least a set of behavioral parameters collected with respect to the usage of the application associated with the application path.

24. The system of claim 23, wherein each of the user profile data structure and the application path profile data structure includes the set of collected behavioral parameters.

25. The system of claim 22, wherein each of behavioral parameters is any one of: a packet rate, a byte rate, a data direction, a new connections per second and per application (CPS), a concurrent number of connections per application (CUC), an average connection duration, an average connection size, and a transport protocol state.

26. The system of claim 22, wherein the system is further configured to:
determine a number of users of a respective application path that can be associated with the at least one behavior group.

27. The system of claim 17, wherein the at least one behavior group is defined by the at least one behavioral rule, wherein the at least one behavioral rule is dynamically changed.

28. The system of claim 27, wherein the at least one behavioral rule is a human linguistics rule being implicitly translated into one or more functions.

29. The system of claim 27, wherein the system is further configured to:
compute a behavioral score for each behavioral parameter included in a user profile data structure and an application path profile data structure; and
correlate the computed the behavioral scores using the at least one behavioral rule to generate the at least one DoF.

30. The system of claim 29, wherein the system is further configured to:
compare the at least one DoF against a threshold to determine an association with the at least one behavior group, wherein the threshold is defined in the at least one behavioral rule.

31. The system of claim 17, wherein the at least one behavior group defines at least any one of: various variance of chatty activity, various variance of malware activity, and various variance of scanning activity.

* * * * *